United States Patent [19]

Rysti

[11] 4,201,506
[45] May 6, 1980

[54] LUMBER-STACKING METHOD AND APPARATUS

[76] Inventor: Alpo Rysti, Frisansintie 22, 02240 Espoo 24, Finland

[21] Appl. No.: 904,504

[22] Filed: May 10, 1978

[51] Int. Cl.² .................................................. B65G 57/18
[52] U.S. Cl. ........................................ 414/68; 414/95; 414/98; 414/786
[58] Field of Search .............. 414/29, 57, 68, 95, 414/98, 786

[56] References Cited

U.S. PATENT DOCUMENTS

| | | | |
|---|---|---|---|
| 3,610,443 | 10/1971 | Berge | 414/68 |
| 3,737,052 | 6/1973 | Lunden | 414/68 |
| 4,057,150 | 11/1977 | Lunden | 414/68 |

Primary Examiner—Stephen G. Kunin
Assistant Examiner—George F. Abraham
Attorney, Agent, or Firm—Steinberg and Blake

[57] ABSTRACT

In a lumber stacking method and apparatus a layer of lumber is conveyed to a lifting location where a pair of arms beneath the layer of lumber are tilted respectively about horizontal axes parallel to a horizontal plane in which the layer is located to engage beneath and raise the layer at the lifting location above the latter horizontal plane, with these arms then being advanced forwardly while supporting the raised layer. The arms are advanced forwardly to become situated over that part of the stack which has already been formed, and at this latter stacking location the arms are lowered by being tilted in a reverse direction so as to situate the transported layer at the top of the stack which is being formed, the arms then being retracted back to the position beneath the lifting location while the transported layer remains at the top of the stack. While these arms move over that part of a stack which has already been formed at the stacking location, lower edge regions of the arms are situated above the uppermost layer of that part of the stack which has already been formed by a distance sufficient to prevent engagement of the arms with any crooked pieces of lumber in the uppermost layer of that part of the stack which has already been formed.

7 Claims, 11 Drawing Figures

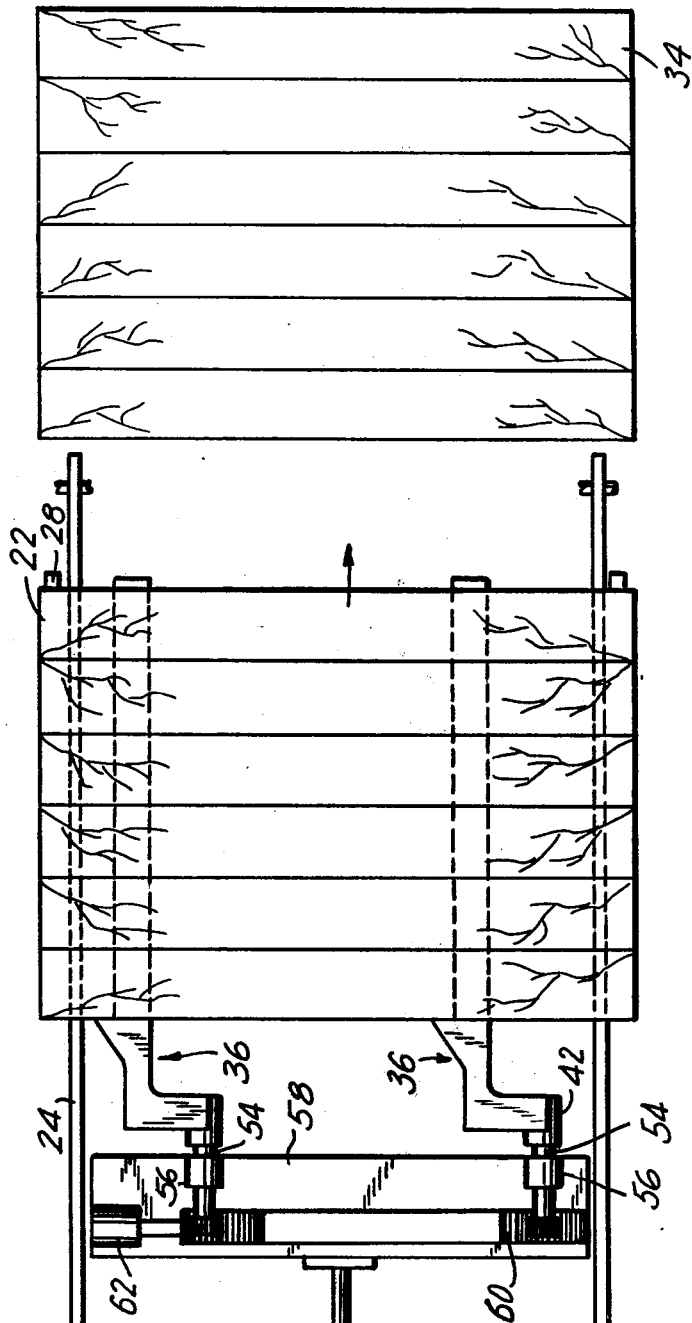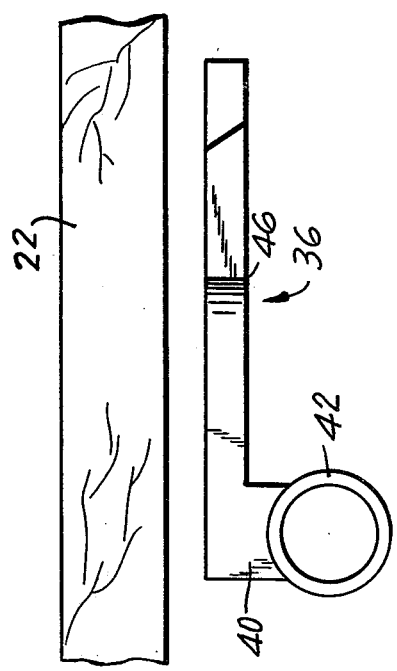
FIG. 4
FIG. 5

LUMBER-STACKING METHOD AND APPARATUS

BACKGROUND OF THE INVENTION

The present invention relates to lumber stacking methods and apparatus.

It is conventional with known lumber stacking methods and apparatus to convey a layer of lumber which is to be situated at the top of a stack which is being formed to a lifting location situated adjacent but in advance of the stacking location, with this layer at the lifting location then being raised and transported to a location over the stack which is being formed, whereupon the transported layer is lowered to be deposited on top of the stack, forming at least temporarily the uppermost layer thereof. The arms are retracted back from the stacking location to the lifting location in preparation for transporting the next layer which is conveyed to the lifting location to the stacking location.

A conventional method and apparatus of the above type is shown, for example, in Finnish Pat. No. 42,188. However, with such a conventional method and apparatus, the lifting arms have at their upper edge regions which engage the layer of lumber at the underside thereof teeth which provide between the arms and the lifted layer of lumber a friction sufficient to prevent movement of the pieces of lumber with respect to the arms while the latter transports the layer of lumber from the lifting location to the stacking location. However such teeth provide undesirable marks in the pieces of lumber, and such marks are unacceptable particularly when the pieces of lumber have already been planed.

Moreover, it sometimes happens that in a given layer of lumber there are one or more crooked pieces which project above the upper surface of the remainder of the uppermost layer of lumber of a stack which has already been partially formed. Under these conditions the arms which lift and advance each layer to the stacking location strike against such crooked pieces of lumber, with the latter interfering undesirably with the movement of the arms, creating problems in the operation of the conventional apparatus.

Furthermore, with conventional methods and apparatus of the above type, the speed with which a given stack can be formed is limited by the time required for a pair of lumber-transporting arms to move from the lifting location to the stacking location and then back to the lifting location to raise the next layer of lumber. Such a cycle of operation of the arms which lift and transport the lumber to the stacking location requires a certain amount of time which is greater than the amount of time required by a conveyer to gather together a layer of lumber in a position ready to be transported to a stack which is being formed. As a result the full potential output of such a conveyor cannot be utilized and the time required for forming a stack of lumber is undesirably great.

SUMMARY OF THE INVENTION

It is accordingly a primary object of the present invention to provide a method and apparatus which will avoid the above drawbacks.

Thus, it is an object of the present invention to provide a method and apparatus according to which it becomes possible to transport layer after layer of lumber to a stack which is being formed, in such a way that the transported lumber will not be undesirably marked by teeth of the arms, while at the same time undesirable shifting of the transported layer with respect to the arms which carry the same is reliably avoided.

Furthermore, it is an object of the present invention to provide a method and apparatus according to which the arms which transport each layer of lumber from the lifting location to the stacking location are positioned in such a way that they will not engage any crooked pieces of lumber which happen to be located in the uppermost layer of lumber of a partially completed stack.

In addition it is an object of the present invention to provide a method and apparatus according to which it becomes possible to form a stack of lumber far more rapidly than has heretofore been possible, with the speed with which the stack is formed being such that it is possible to utilize the full potential of a conveyer which gathers together a layer of lumber at the lifting location ready to be transported to the stacking location, so that with such a method and apparatus it is not necessary, for example, to stop and start the conveyer or to operate the conveyer at a particularly slow speed.

It is furthermore an object of the present invention to provide a method and apparatus which are exceedingly economical and reliable, greatly reducing the power required for carrying out the operations while at the same time providing a relatively simple apparatus which requires only a small amount of space.

Moreover, it is a general object of the present invention to develop further the state of the art as exemplified by the above Finnish Pat. No. 42,188.

According to the method and apparatus of the invention, layer after layer of lumber are conveyed by a conveyer means in a horizontal plane to a lifting location which is situated adjacent but in advance of a stacking location where a stack of lumber is to be formed. Beneath each layer of lumber which arrives at the lifting location there is at least one pair of lifting arms which have a retracted position where these arms, which are flat, are parallel to the horizontal plane of the layer at the lifting location. The lifting arms extend in the general direction of travel of the layer from the lifting location to the stacking location and are spaced transversely with respect to each other and with respect to the direction of travel from the lifting location to the stacking location. These arms are simultaneously tilted about horizontal axes which extend in the direction of travel from the lifting location to the stacking location in order to turn upwardly and engage the layer at the lifting location for raising the layer above the horizontal plane in which they are conveyed, and while the layer of lumber is thus lifted by the arms, the arms are advanced to a location over that part of a stack of lumber which has already been formed at the stacking location, to transport the layer of lumber in a raised condition to the stacking location. At the stacking location the arms are turned back down to their horizontal positions parallel to the plane in which the layer of lumber is conveyed to the lifting location, and in this attitude the arms are retracted back to a position beneath the lifting location, whereupon the above cycle of operations is repeated. The above arms engage the lumber only with smooth surface portions and have rear stops to prevent rearward movement of a layer with respect to the arms.

BRIEF DESCRIPTION OF DRAWINGS

The invention is illustrated by way of example in the accompanying drawings which form part of this application and in which:

FIG. 4 is a schematic top plan view illustrating also the method and apparatus of the invention;

FIG. 5 is an end view of a lifting arm of the invention as seen when looking toward the rear end of the lifting arm;

DESCRIPTION OF PREFERRED EMBODIMENTS

Figure 1:
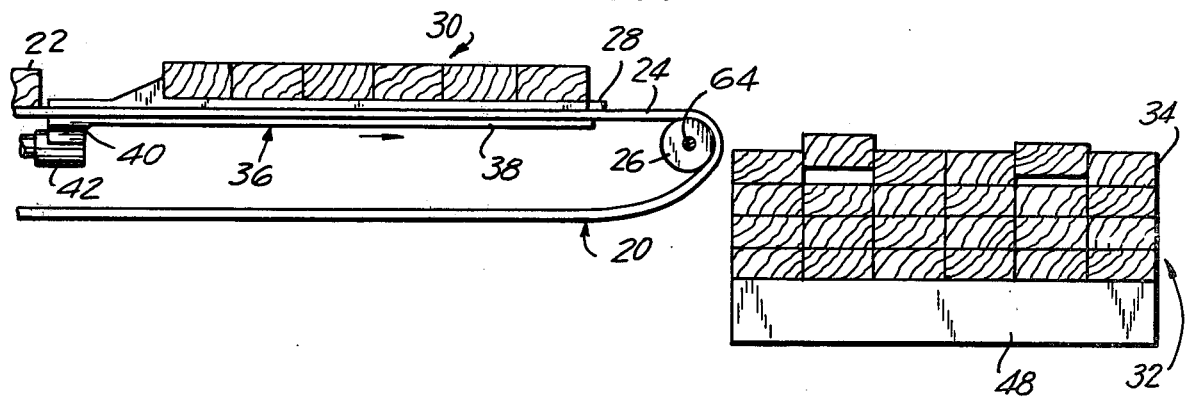
FIGS. 1-3 schematically illustrate part of the apparatus of the invention and respectively illustrate successive steps in the method of the invention.

Referring to FIG. 1, it will be seen that there is schematically illustrated therein a conveyer means 20 which conveys pieces of lumber 22 in a horizontal plane formed by the upper surfaces of the upper runs of the conveyer chains of the conveyer 20 to a lifting location which is shown in FIG. 1. It will be understood that the conveyer means 20 includes at least one pair of endless chains 24 guided around sprockets, one of these sprockets 26 being shown in FIG. 1. The sprockets are supported for rotary movement about their horizontal axes, and the front sprockets 26 which are shown in FIG. 1 are driven so that the upper horizontal runs of the chains 24 move toward the right as indicated by the arrow in FIG. 1. The left piece of lumber 22 is shown in FIG. 1 in the plane in which it is conveyed to the lifting location. Situated just outside of and beside the chains of the conveyer 20 are a pair of stationary stops 28 which engage the first piece of lumber 22 to arrive at the lifting location, and as the successive pieces of lumber are conveyed to the lifting location, they become situated one next to the other so as to form in this way a layer 30 which is to be lifted at the lifting location and transported to a stacking location situated in advance of and adjacent to the lifting location. A partially formed stack 32 is shown in FIG. 1 at the stacking location. Thus it will be seen that this stack 32 has an uppermost lumber layer 34 the upper surface of which is situated at least approximately at the horizontal plane in which the lumber pieces 22 are conveyed by the conveyer means 20 to the lifting location.

At the lifting location which extends to the left from the stops 28, as viewed in FIG. 1, the layer of lumber 30 is lifted by way of a pair of lifting arms 36 one of which is shown in FIG. 1. The pair of lifting arms 36 are situated initially in a retracted position beneath the plane occupied by the layer 30 which arrives at the lifting location. Each lifting arm 36 is of a substantially L-shaped configuration having a relatively long longitudinally extending leg 38 which extends in the direction of travel of each lumber layer 30 from the lifting location to the stacking location. At its rear end each relatively long longitudinally extending leg 38 of each lifting arm 36 is integrally fixed with a relatively short transversely extending leg 40, and each leg 40 terminates at its free end in an integral tubular portion 42 which receives a shaft which carries each leg 36 and which is fixed to the sleeve 42 in the interior thereof so that when this shaft is turned about its axis, which extends parallel to the leg 38, the arm 36 will be turned about the axis of the tubular portion 42.

Figure 7:
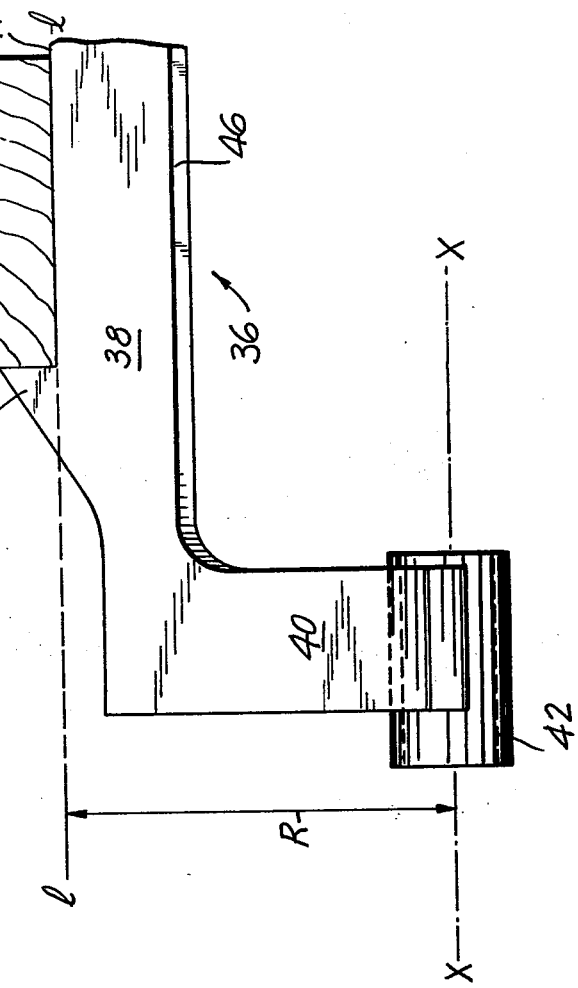
FIG. 7 is a fragmentary side view of the rear portion of the arm illustrated in FIG. 6.
Figure 6:
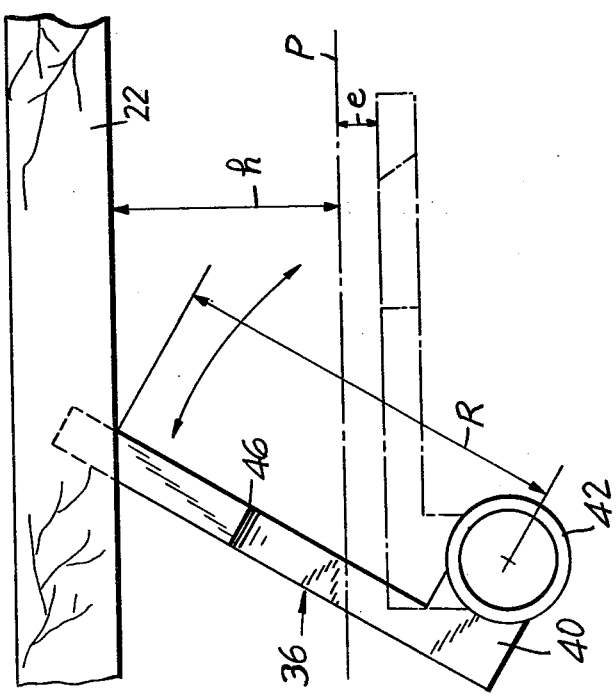
FIG. 6 shows the arm of FIG. 5 after it has been tilted upwardly to raise a layer of lumber.

This arrangement is shown most clearly in FIGS. 5-7. Thus, FIG. 5 shows the flat arm 36 in a horizontal plane beneath the plane occupied by the pieces of lumber 22 at the lifting location. As each arm 36 is tilted upwardly from the horizontal to the inclined position shown in FIG. 6, each leg 38 has an upper edge 44 which engages the lumber pieces 22 at the underside thereof, in the layer 30 formed by these lumber pieces, and this edge 44 is situated at the radius R from the axis X—X of the tubular portion 42 of each arm 36. Thus, as is apparent from FIG. 6, as each arm 36 turns from the horizontal to the inclined attitude illustrated in FIG. 6, each piece of lumber 22 will be lifted through the elevation h so as to be situated by way of the arms 36 above the plane P by the distance h indicated in FIG. 6. This plane P is the plane formed by the top surface of the upper runs of the conveyer means 20. The distance h through which the layers of lumber are successively lifted is also indicated in FIG. 2.

Figure 2:
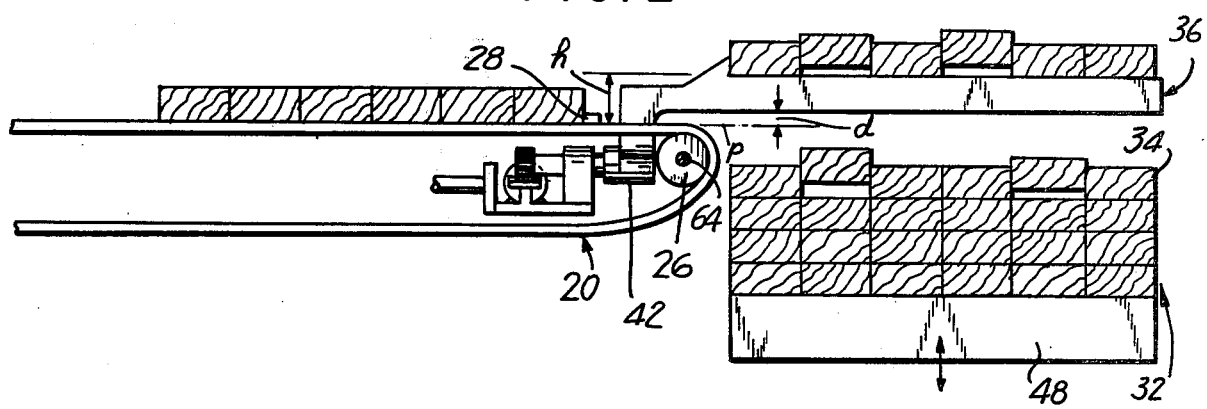

Moreover, it will be seen that each arm 36 has, when in its raised inclined attitude, a lower elongated edge 46 which extends parallel to the edge 44 and which is situated above the plane P by the distance d indicated in FIG. 2. As is apparent from FIG. 1, the uppermost layer 34 of a stack 32 which has already been formed has its upper surface situated also substantially or approximately at the plane P, and some of the pieces of timber or lumber of this upper layer 34 may be crooked, as indicated in FIG. 2, so that these crooked pieces extend above the plane P when the uppermost layer 34 has a position somewhat higher than shown in FIG. 1. The distance d by which the lower edge 46 of the longitudinally extending leg 38 of each arm 36 extends above the plane P, as indicated in FIG. 2, is sufficient to prevent engagement of the arms 36 with any such crooked pieces in the uppermost layer 34 of that part of the stack 32 which has already been formed.

It is to be noted that the stack 32 is formed on an elevator means 48 of a known construction which is lowered through an increment equal to the thickness of each layer after each layer becomes deposited at the top of the stack which is being formed. Such an elevator means is shown, for example, in U.S. Pat. No. 2,686,603. The arms 36 are shown in FIG. 2 when they have already arrived at the end of their forward travel and when the elevator means 48 has already lowered the stack through the above increment. However, during the initial part of the travel of the arms 36 from the lifting location to the stacking location, the uppermost layer 34 of the stack portion which has already been formed may still have its upper surface somewhat higher than shown in FIG. 1 approximately in the plane P, and thus under these conditions because of the distance d provided between the lower edges 46 of the arms 36 and plane P, these arms 36 will not engage any crooked pieces of lumber in the uppermost layer at the stack portion which has already been formed. In FIG. 1 the stack is shown when it has just been lowered through the above increment.

Thus, it will be understood that there are at least a pair of arms 36 which are simultaneously tilted so as to be raised from the horizontal to the inclined attitudes indicated for the arm 36 in FIG. 6, and thus the layer of lumber initially at the plane P at the lifting location is raised through the distance h and when at the elevation h above the plane P, the raised layer of lumber is transported to a position situated vertically in alignment above the uppermost layer of the stack portion which has already been formed, and the parts are shown in FIG. 2 just after the new layer to be deposited on top of the stack has arrived at the stacking location with the arms already starting to tilt back down to their horizontal attitude so that the transported layer is about to be deposited on top of the stack, and of course the elevator means 48 has already lowered the stack through an increment equal to the thickness of one layer as set forth above.

Figure 3:
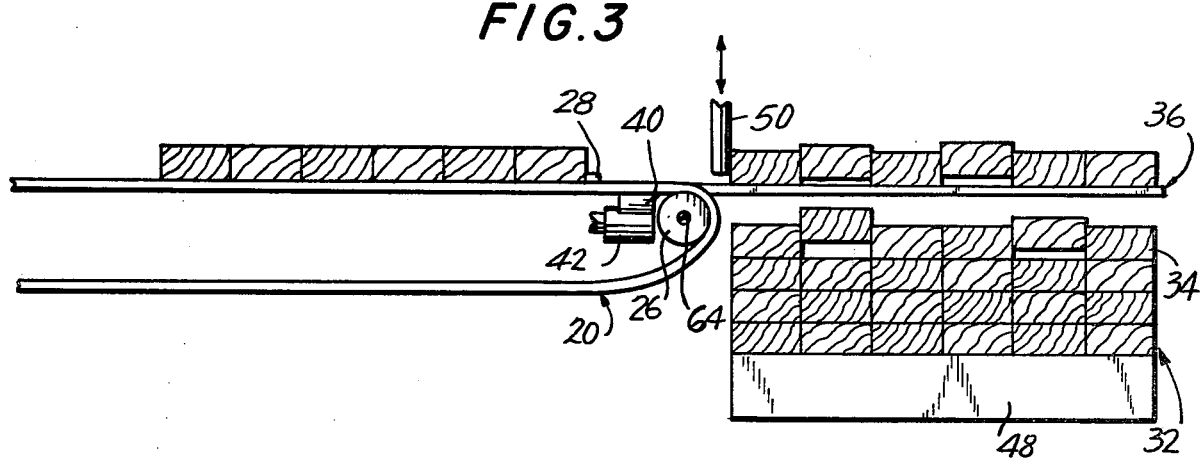

In the example illustrated in FIGS. 1–3, the stack 32 which is being formed has the successive horizontal layers of lumber situated one directly on the other to form a lumber package in which there are no spaces between the successive layers of lumber. When forming such a stack, the arrival of the arms 36 at the forward end of their travel from the lifting location to the stacking location is utilized to transmit a signal for supplying hydraulic fluid, for example, to a pair of cylinders the pistons of which are connected to a pair of piston rods 50 situated one behind the other, as viewed in FIG. 3, and these rods 50 are moved down so as to engage the trailing piece of lumber, considered in the direction of travel from the lifting location to the stacking location. The rods 50 are shown in FIG. 3 moving downwardly with the layer of lumber which has just been transported to the stacking location, and these arms 36 continue to turn downwardly about the axes X—X until they again reach the attitude shown at the lower position of the arm 36 in FIG. 6, where the upper surfaces of the flat arms are situated by the distance e beneath the plane P, and in this position with the stops 50 still engaging the trailing piece of lumber the arms are retracted back to their retracted positions situated beneath the next layer of lumber which has arrived at the lifting location ready to be raised.

Of course, in some cases the stacks which are formed are to be delivered to a kiln or the like where the lumber is to be dried, and for this purpose after each layer is deposited on the stack, spacer sticks are situated thereon, manually, for example, so that as each layer is lowered onto the stack, each layer will rest on such spacer sticks which provide spaces between the successive layers through which drying air may travel, and under these conditions the stops 50 need not be utilized since the thickness of the arms 36 is such that this thickness is less than the depth of the sticks and thus less than the spacing between the successive layers, so that with such a stack the deposited layer at the top of the stack will remain on the spacer sticks and the arms 36 can readily be withdrawn from the space between the pair of uppermost layers of the stack which is being formed.

With the structure of the invention not only are the arms 36 of an L-shaped configuration so that the lower edges 46 of the legs 38 will clear any crooked pieces in the uppermost lumber layer, but in addition the upper edges 44 of the legs 38 are smooth so that they will not provide undesirable markings at the lower surfaces of the lumber pieces 22, such markings being particularly undesirable in the case of lumber pieces which have already been planed. Thus these smooth upper edges 44 of the arms 36 form a further feature of the invention.

In addition, according to yet another feature of the invention, each arm 36 is provided at the rear portion of the upper edge 44 thereof with a stop projection 52 for engaging behind the piece of lumber which trails at the layer which is being transported from the lifting location to the stacking location. FIG. 7 illustrates the stop projection 52 engaging such a trailing end piece of lumber 22. Thus by reason of this feature the layer of lumber which is being transported cannot move rearwardly with respect to the arms 36, and at the same time the smooth edges 44 can be utilized. If desired the arms 36 can be coated particularly at the region of the edges 44 thereof with a rubberized coating or the like to provide a relatively high coefficient of friction between the arms 36 at the region of their edges 44 and the pieces of lumber 22 so as to further prevent any undesirable movement of the pieces of lumber with respect to the arms 36 during transportation of each layer from the lifting location to the stacking location.

In the schematic plan view of FIG. 4, the pair of stops 28, supported by any suitable structure, are shown just outside of the pair of endless chains 24 of the conveyer means 20. FIG. 4 illustrates how a pair of arms 36 are situated between the chains 20 and of course in their retracted position in the horizontal attitude shown in FIG. 6 beneath the plane P where the lower surface of the layer of lumber pieces 22 is situated. FIG. 4 shows how the tubular portions 42 are fixed with rotary shafts 54 situated in suitable sleeves or bearings 56 which are carried by a carriage 58 which is schematically illustrated. The shafts 54 while being turnable in the bearing sleeves 56 cannot move axially with respect thereto, and the carriage 58 is advanced and retracted in order to bring about the above operations during which the arms 36 are displaced from their retracted position beneath the layer of lumber at the lifting location to their advanced position situated over the uppermost layer 34 of that part of the stack which has already been formed. The left ends of the shafts 54 are operatively connected with tilting means which acts on these shafts to turn the same and thus the arms 36 therewith so as to be able to turn the arms 36 between the positions indicated in FIG. 6. Thus these left or rear ends of the shafts 54 are formed with teeth so as to have the construction of pinions both of which mesh with an elongated rack 60 connected to a piston of a cylinder-and-piston assembly 62 which is connected to a source of fluid under pressure for longitudinally moving the rack 60 in one direction or the other to bring about the turning of the shaft 54 and thus of the arms 36 between the positions indicated in FIG. 6. Of course the turning or tilting means formed by the rack 60 and the power means 62 as well as the pinions at the rear ends of the shaft 54 moves together with the carriage 58.

Figure 8:
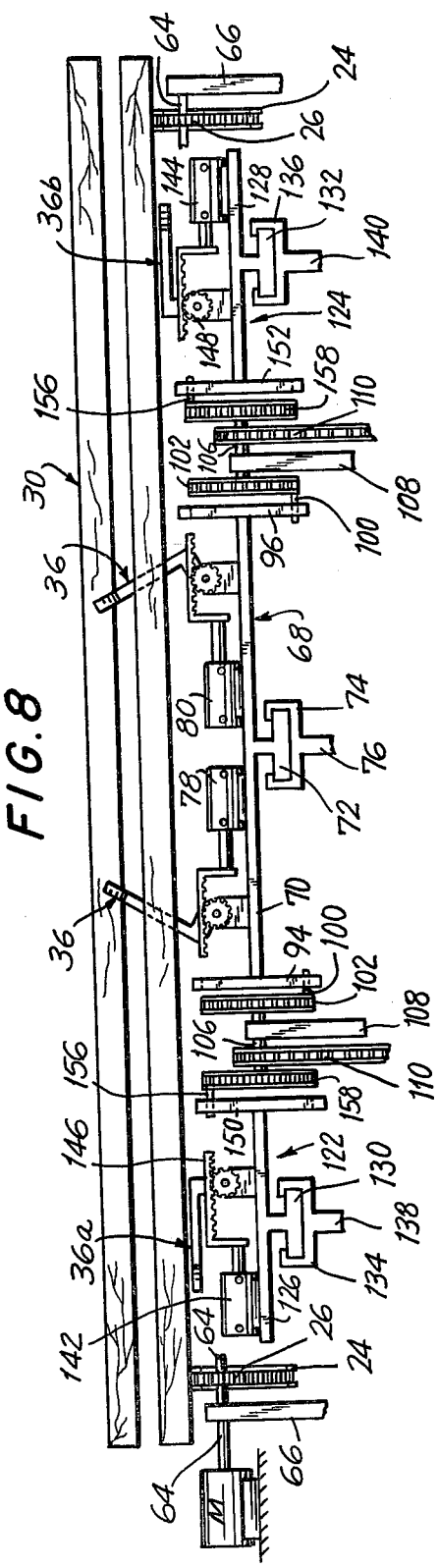
FIG. 8 is a schematic transverse elevation of a further embodiment of a method and apparatus of the invention as seen when looking from a rear part of the lifting location toward the stacking location.

FIGS. 8–11 show details of one possible embodiment of an apparatus of the invention for carrying out the method of the invention. FIG. 8 is a transverse elevation taken just behind a piece of timber 22 such as the left piece of timber 22 shown in FIG. 1, looking toward the stacking location, with a layer 30 of lumber being shown in FIG. 8 as it is being transported from the lifting location toward the stacking location. Thus FIG. 8 shows the front sprockets 26 and the chains 24 of the conveyer means 20, the sprockets 26 being supported for rotary movement by way of shaft 64 which fixedly carries the sprockets 26 and which is supported for turning movement in bearings carried by side frame members 66 which are schematically illustrated in FIG. 8. Of course the rear sprockets of the conveyer means 20 are not illustrated, and it is shaft 64 which is driven, for example by a motor M, so that the upper runs of the chains 24 travel forwardly in the direction from the lifting location toward the stacking location.

Figure 9:
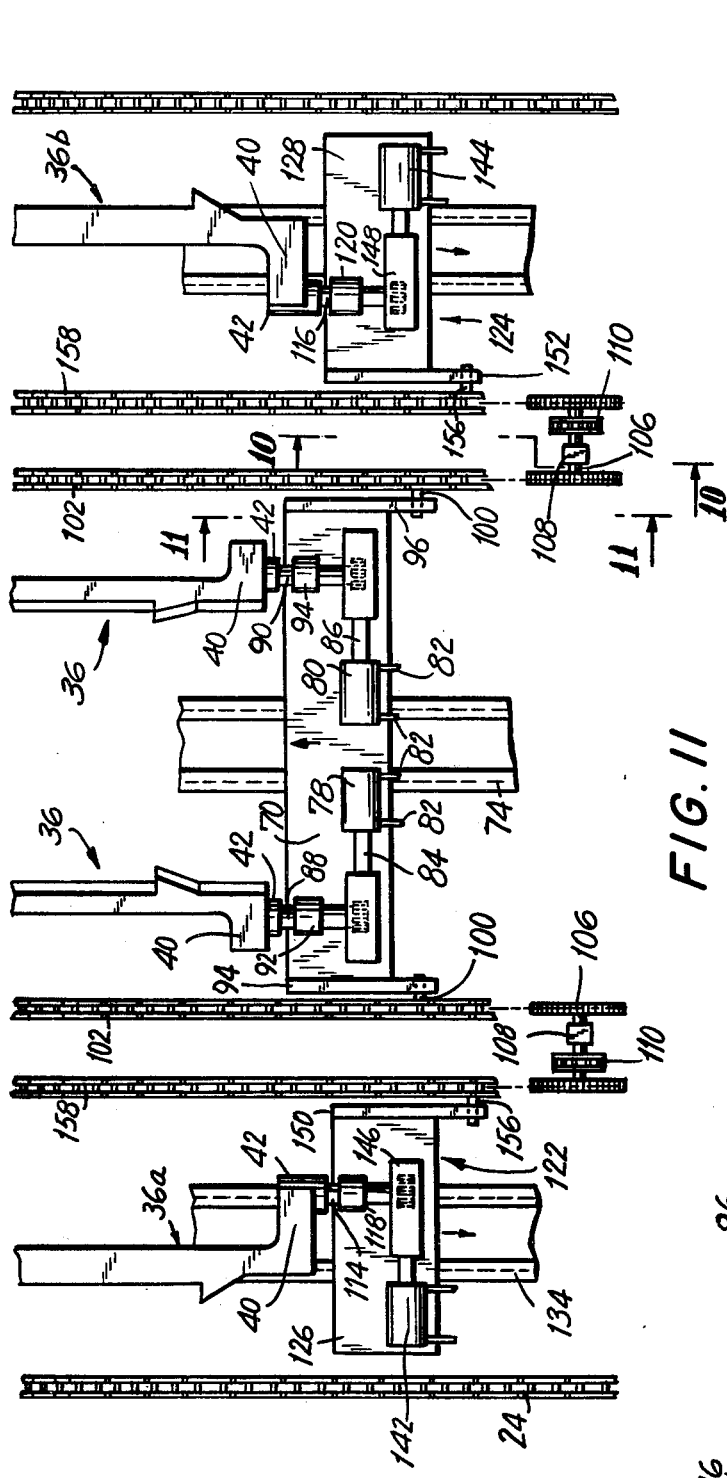
FIG. 9 is a fragmentary plan view illustrating part of the structure of FIG. 8 situated beneath the lumber.

The structure illustrated in FIGS. 8 and 9 includes a central carriage 68 corresponding to the carriage 58 of FIG. 4 and including a flat horizontal wall 70 which is mounted on a guide rail 72 which is slidable within a horizontal channel 74 carried by the central frame structure 76 which is schematically illustrated. The wall 70 of the carriage 68 fixedly carries at its upper side a pair of power units 78 and 80 each of which corresponds to the power unit 62, the cylinders of these units communicating through flexible hoses 82 with a source of hydraulic fluid under pressure which is caused to flow into and out of the units 78 and 80 to bring about the operations referred to below. The pistons within the cylinders 78 and 80 are operatively connected with racks 84 and 86 which mesh with pinions at the rear ends of rotary shafts 88 and 90, each of which corresponds to a shaft 54. These shafts 88 and 90 extend through sleeve bearings 92 and 94 fixedly mounted on the horizontal wall 70 of the carriage 68. The front ends of the shafts 88 and 90 extend into and are fixed to tubular portions 42 of a pair of arms 36 which have the construction described above.

When the carriage 68 has reached the end of its rearward travel so that the central pair of arms 36 are in their retracted position beneath the layer of lumber at the lifting location, a suitable signal is transmitted to a pair of valves which are operated so that from any suitable source pressure fluid is delivered to the cylinders of the units 78 and 80 to cause the racks 84 and 86 to be displaced outwardly respectively toward the opposed side edges of the wall 70, and this will bring about counterclockwise turning of the arm 36 at the left side if the carriage 68 and clockwise turning of the arm 36 at the right side of the carriage 68, as viewed in FIG. 8, so that in this way these arms 36 simultaneously turn upwardly from their horizontal to their inclined attitudes, thus raising the layer of lumber 30 to the elevation provided for transporting this layer to the stacking location as described above. Of course in this example the pair of arms 36 simultaneously turn in opposite directions whereas in the example of FIG. 4 they turn in the same direction.

Figure 11:
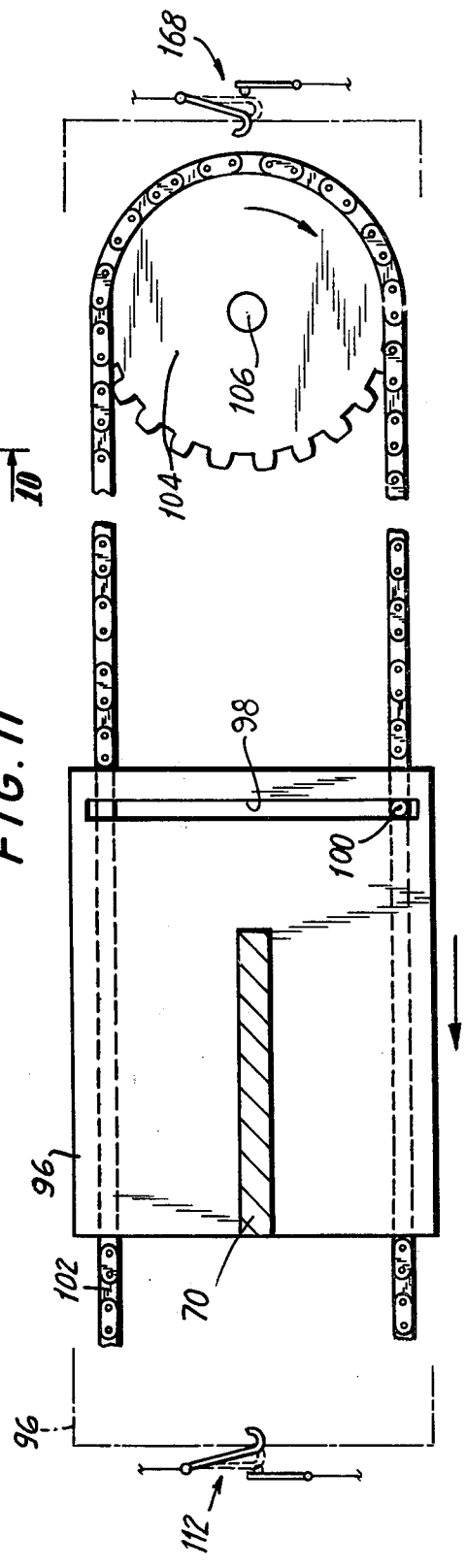
FIG. 11 is a fragmentary schematic side elevation of part of the structure of FIG. 9 taken along line 11—11 of FIG. 9 in the direction of the arrows.

A moving means is provided for moving the pair of arms 36 from the lifting location to the stacking location and then back to the lifting location. This moving means includes in the illustrated example a pair of vertical walls 94 and 96 which are fixed to the opposed end or side edges of the horizontal wall 70, these vertical walls 94 and 96 extending above and below the wall 70 as well as rearwardly beyond the rear edge thereof. Rearwardly beyond the rear edge of the wall 70, each of the vertical walls 94 and 96 is formed with a vertical slot. Thus FIG. 11 shows the vertical slot 98 which is formed in the wall 96, and of course an identical slot is formed in the wall 94. These slots 98 respectively receive a pair of horizontal pins 100 which are respectively fixed to a pair of endless chains 102 which travel around front are rear sprockets. The front sprockets for the chains 102 have a common horizontal axis situated just behind the common horizontal axis of the sprockets 26 while the rear sprockets 104, one of which is shown in FIG. 11, also have a common horizontal axis and are situated a relatively short distance behind the arms 36 when the latter are in their retracted positions. The rear sprockets 104 are fixed to rotary shafts 106 supported for rotation in bearings carried by upright frame members 108. The shafts 106 extend through and beyond these bearings carried by the upright frame members 108 which are fragmentarily illustrated, and outwardly beyond the frame members 108 the shafts 106 carry drive sprockets meshing with endless chains 110 which at their lower unillustrated ends extend around sprockets connected to a common shaft which is driven from any suitable motor, so that in this way the shafts 106 are rotated so as to cause the chains 102 to travel around the sprockets on which they are mounted. The unillustrated front sprockets for the chains 102 are supported in a manner similar to the rear sprockets 104, by way of additional frame members corresponding to frame members 108 are carrying bearings for the shafts which fixedly carry the front sprockets.

The direction of rotation given to the shafts 106 is such that the upper runs of the chains 102 travel rearwardly while the lower runs thereof travel forwardly with the rear sprocket 104 shown in FIG. 11 turning in a clockwise direction, as indicated by the arrow. The pins 100 which transmit the movement of the chains 102 to the carriage 68 are always coaxial. Thus, the pins 100 are shown in FIG. 11 at the lower run of the chains 102 travelling forwardly so that at this time the arms 36 above the carriage 68 have been turned upwardly and are advancing a layer 30 toward the stacking location. When reaching the front sprockets, the pins 100 travel around these front sprockets, terminating the forward movement of the carriage 68, and then the pins 100 arrive at the upper runs of the chains 102 so as to travel rearwardly for retracting the carriage 68, so that through this simple structure the continuously operating chains 102 cooperate with the carriage 68 for moving the pair of arms thereabove forwardly and rearwardly to carry out the above cycle of operations. FIG. 11 shows schematically in phantom lines the wall 96 at the forward end of its travel closing a normally open switch 112 so as to operate in this way one or more solenoid valves which control the flow of hydraulic fluid under pressure to the power units 78 and 80 to bring about movement of the racks 84 and 86 which will turn the arms 36 back down to their horizontal attitudes for lowering the transported layer of lumber onto the stack, with the continued operation of the chains 102 retracting the arms 36 as described above.

With the particular embodiment of the invention which is illustrated in FIGS. 8–11, there are, in addition to the central pair of arms 36, an outer pair of arms 36a and 36b which are identical with the central pair of arms 36 and with the arms 36 described above in connection with FIGS. 1–7. These arms 36a and 36b have their tubular portions 42 fixed to a pair of shafts 114 and 116 which are turnably supported in sleeve bearings 118 and 120, respectively, which in turn are fixedly carried by carriages 122 and 124, respectively. The carriages 122 and 124 respectively include horizontal walls 126 and 128 which are respectively supported on guide rails 130 and 132 (FIG. 8) which are in turn supported for horizontal sliding movement in the horizontal channels 134 and 136 which are supported by frame members 138 and 140. The horizontal walls 126 and 128 of the carriages 122 and 124 also fixedly carry power units 142 and 144 capable of longitudinally shifting the transversely extending racks 146 and 148 which mesh with pinions at the rear ends of the shafts 114 and 116. The hydraulic power units 142 and 144 are connected through suitable flexible hoses with a source of hydraulic fluid under pressure the delivery of which to the power units 142 and 144 is such that the racks 146 and 148 are longitudinally shifted in a manner described below.

Figure 10:
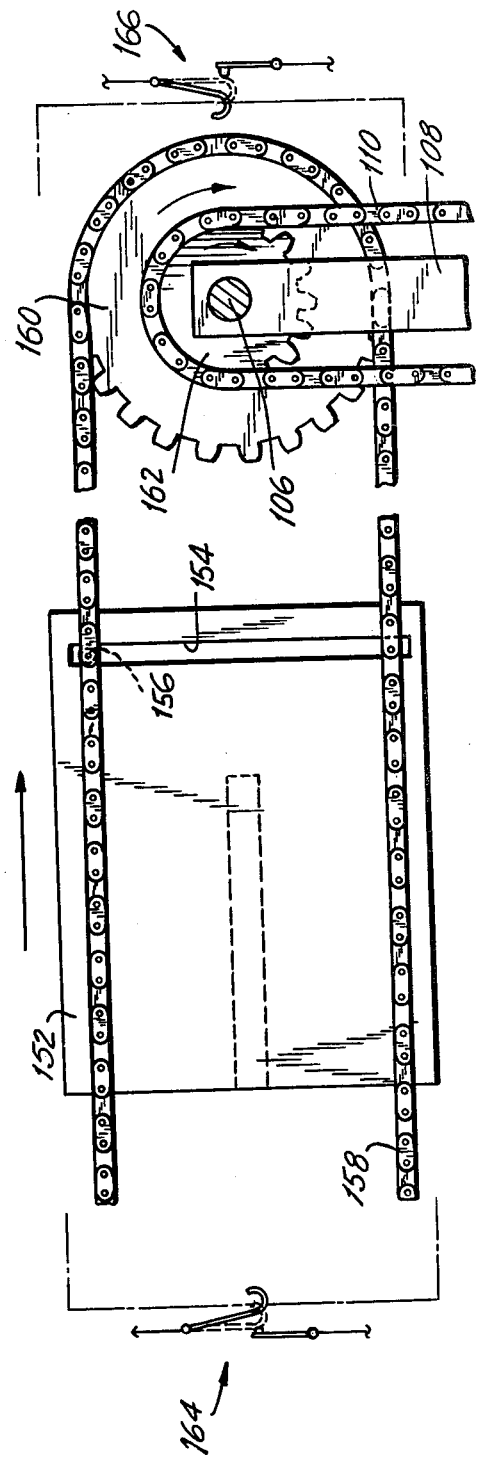
FIG. 10 is a fragmentary side elevation of part of the structure of FIG. 9, taken along line 10—10 of FIG. 9 in the direction of the arrows.

The inner side edges of the horizontal walls 126 and 128 of the carriages 122 and 124 are fixed to vertical walls 150 and 152 which are respectively formed to the rear of the horizontal walls 126 and 128 with vertical slots. Thus the wall 152 is shown in FIG. 10 with the vertical slot 154 formed therein, and it will be understood that an identical slot is formed in the wall 150. These slots 154 of the walls 150 and 152 respectively receive a pair of horizontal pins 156 which are respectively fixed to and project from a pair of endless chains 158 which are identical with and coextensive with the chains 102. The pair of shafts 106 extend outwardly beyond the drives 110 and at their outer ends fixedly carry sprockets around which the rear ends of the chains 158 travel. One of these rear sprockets 160 is shown in FIG. 10. FIG. 10 also illustrates the supporting frame member 108 for the right rear shaft 106 of FIG. 9 as well as the driving sprocket 162 which is fixed to the shaft 106 and which is driven by the chain drive 110. The front ends of the chains 158 travel around a pair of front sprockets which re identical with the sprockets 160 and the axis of which coincides with the axis of the front sprockets of the chains 102, the left pair of chains 102 and 158 of FIGS. 8 and 9 travelling at their front ends around a pair of coaxial sprockets supported for rotation by a shaft which extends only between this pair of front sprockets and which is supported for rotation in a bearing supported by a frame member similar to the frame member 108. In the same way the right pair of chains 102 and 158 of FIGS. 8 and 9 travel at their front ends around a pair of sprockets which are supported only by a relatively short shaft which extends between this pair of sprockets, terminating at these sprockets and supported intermediate its ends by a bearing carried also by a suitable frame member similar to the frame member 108.

Thus, all of the chains 102 and 158 are of the same length and are coextensive with each other and all travel in the same direction simultaneously. However, the pair of pins 156, which remain at all times coaxial with each other, are connected to parts of the chains 158 which are opposed to the corresponding parts of the chains 102 to which the pins 100 are connected. Thus when the pins 100 are at the rearmost part of the rear sprockets 104, the pins 156 are at the forwardmost parts of the front sprockets. As a result when the pins 100 are travelling forwardly at the lower runs of the chains 102, the pins 156 are simultaneously travelling rearwardly at the upper runs of the chains 158. As a result, while the carriages 122 and 124 will move identically, these carriages will at all times move oppositely to the central carriage 68. Thus when the central pair of arms 36 are at the forward end of their travel, the outer pair of arms 36a and 36b are at the rear end of their travel. Thus, in the position of the parts shown in FIGS. 8–11, the central pair of arms 36 have been tilted upwardly and are travelling forwardly, delivering a layer 30 of lumber to the stack, while the outer arms 36a and 36b are in their lower horizontal attitudes and are being retracted rearwardly. FIG. 10 illustrates schematically how the wall 152 when reaching the forward end of its travel is capable of closing a normally open switch 164 to bring about actuation of the power units 142 and 144 to lower the arms 36a and 36b, these power units 142 and 144 forming a tilting means for the arms 36a and 36b. In the same way when the wall 152 reaches the rear end of its travel it is capable of closing a normally open switch 166 which provides for actuation of the power units 142 and 144 to raise the arms 36a and 36b. Similarly when the plate or wall 96 reaches the rear end of its travel it is capable of closing a normally open switch 168 to bring about raising of the central pair of arms 36. Thus, the several switches 112, 164, 166 and 168 are connected into a circuit which includes suitable solenoid valves, for example, which cooperate with the hydraulic fluid delivered to and from the various power units so as to bring about the upward and downward tilting of the arms of the invention.

Thus, with the arrangement of FIGS. 8–11 when one pair of arms is in its raised position transporting a layer of lumber to the stack, the other pair of arms is in its lower position and is being retracted to the lifting station for then engaging the next layer of lumber to transport the same.

Therefore, with an arrangement as shown in FIGS. 8–11 it is possible to form a stack in an extremely short time, the conveyor means 20 being operated in such a way that each time one pair of arms reaches the end of its rearward movement there is a layer of lumber ready to be raised and transported thereby. Thus with the arrangement of FIGS. 8–11 it is possible to form a stack in approximately one half the time which would be required if only one pair of arms were utilized, and at the same time the conveyor means 20 can be utilized to its full potential.

At the same time the arrangement of FIGS. 8–11 is highly flexible. For example, depending upon the nature of the operations and the particular type of lumber which is being handled, it may be more advantageous to operate only with one pair of arms. In this event it is possible to remove the pins 100 and operate only with the outer arms 36a and 36b, or, if desired, it is possible to remove the pins 156 and operate only with the central pair of arms 36.

Of course it is to be understood that the invention is not to be limited to the particular details described above and shown in the drawings since the invention can be practiced by other structures, being limited only by the features called for by the claims which follow.

What is claimed is:

1. In a lumber stacking method, the steps of conveying a layer of lumber in a horizontal plane to a lifting location which is situated in advance of and adjacent to a stacking location where a stack of lumber is to be formed, that part of a stack which has already been formed at said stacking location having an upper layer which has an upper surface situated at least approximately in said horizontal plane, then lifting the layer of lumber which has arrived at said lifting location from beneath with arms which have only smooth surfaces engaging the lifted layer at the underside thereof and which extend in the direction of travel of said layer toward said stacking location, while simultaneously situating behind the last piece of timber of said layer which is at the end thereof which trails in the direction of movement toward the stacking location a stop to prevent rearward movement of the layer with respect to said arms, the lifting of said layer at said lifting location by way of said arms elevating said layer to an elevation higher than said horizontal plane, and while said layer is thus situated at the latter elevation, advancing said arms to a location over the uppermost layer of that part of the stack which has already been formed, the travel of said arms over said uppermost layer of that part of the stack which has already been formed being continued until the lifted layer is carried by said arms is situated vertically in alignment above the uppermost layer of that part of the stack which has already been formed, then lowering said arms and the layer carried thereby toward said uppermost layer of the stack which has already been formed, retracting said arms back to said lifting location while said arms are at the elevation to which they have been lowered when lowering the previously lifted layer toward the uppermost layer of that part of the stack which has already been formed, while the lifted layer which has been transported to the stacking location by said arms remains at the stacking location, so that the thustransported layer now forms the uppermost layer of the stack, lowering the stack by an increment equal to the thickness of a layer of lumber in preparation for receiving the next layer at said stack, and repeating the above cycle of operations for forming a stack of a given height at said stacking location, providing between the arms as they move over the uppermost layer of that part of the stack which has already been formed and the uppermost layer a space which is sufficient to prevent contact between said arms and any timber pieces of the uppermost layer of the stack which has already been formed which may be crooked and which may extend to an elevation higher than other parts of the uppermost layer of that part of the stack which has already been formed, and tilting said arms respectively about horizontal axes which extend parallel to those portions of the arms which engage a layer of lumber in order to raise and lower a layer of lumber carried by said arms.

2. In a lumber stacking method, the steps of conveying a layer of lumber in a horizontal plane to a lifting location which is situated in advance of and adjacent to a stacking location where a stack of lumber is to be formed, that part of a stack which has already been formed at said stacking location having an upper layer which has an upper surface situated at least approximately in said horizontal plane, then lifting the layer of lumber which has arrived at said lifting location from beneath with arms which have only smooth surfaces engaging the lifted layer of the underside thereof and which extend in the direction of travel of said layer toward said stacking location, while simultaneously situating behind the last piece of timber of said layer which is at the end thereof which trails in the direction of movement toward the stacking location a stop to prevent rearward movement in the layer with respect to said arms, the lifting of said layer at said lifting location by way of said arms elevating said layer to an elevation higher than said horizontal plane, and while said layer is thus situated at the latter elevation, advancing said arms to a location over the uppermost layer of that part of the stack which has already been formed, the travel of said arms over said uppermost layer of that part of the stack which has already been formed being continued until the lifted layer carried by said arms is situated vertically in alignment above the uppermost layer of that part of the stack which has already been formed, then lowering said arms and the layer carried thereby toward said uppermost layer of the stack which has already been formed, retracting said arms back to said lifting location while said arms are at the elevation to which they have been lowered when lowering the previously lifted layer toward the uppermost layer of that part of the stack which has already been formed, while the lifted layer which has been transported to the stacking location by said arms remains at the stacking location, so that the thustransported layer now forms the uppermost layer of the stack, lowering the stack by an increment equal to the thickness of a layer of lumber in preparation for receiving the next layer at said stack, and repeating the above cycle of operations for forming a stack of a given height at said stacking location, and utilizing two pairs of arms for successively transporting layers of lumber from said lifting location to said stacking location, and retracting one pair of arms from the stacking location to the lifting location while the other pair of arms is transporting a layer from the lifting location to the stacking location, and so on, while conveying to said lifting location a layer of lumber to be received by each pair of arms when the latter rereturns to the lifting location.

3. In an apparatus for stacking lumber, conveyor means for conveying layers of lumber one after the other in a horizontal plane to a predetermined lifting location situated in advance of and adjacent a stacking location where a stack of lumber is to be formed with that part of the stack which has already been formed having an uppermost lumber layer the upper surface of which is substantially in said horizontal plane, a pair of substantially flat lifting arms having a retracted position situated beneath said horizontal plane at said lifting location, said pair of arms being transversely spaced from each other with respect to the direction of travel from said lifting location to said stacking location, and each arm being of a substantially L-shaped configuration and having a longitudinally extending relatively long leg which extends in said direction of travel while being situated beneath a layer at said lifting location in the retracted position of each arm, and each arm having a relatively short transversely extending rear leg terminating in a free end region distant from the connection between said legs of each arm, tilting means operatively connected with said arms at said free end regions of said relatively short transversely extending legs thereof for tilting said arms respectively about a pair of parallel horizontal axes which extend parallel to said horizontal plane for simultaneously turning said arms upwardly from horizontal attitudes parallel to said horizontal plane and beneath the same to inclined attitudes inclined with respect to said horizontal plane and extending to an elevation sufficient to engage a layer at said horizontal plane in the lifting location at an underside of said layer with upper edge regions of said longer legs of said arms and raise the layer from said horizontal plane to an elevation above the same, and moving means operatively connected to said arms for moving the same together with said tilting means operatively connected thereto forwardly from said retracted position while a layer of lumber has been elevated above said horizontal plane and is carried by said arms to an advanced position situated over a stack which is being formed, said tilting means cooperating with said arms for tilting the latter back down toward their horizontal positions at the stacking location for lowering the layer advanced by said arms to said stacking location toward the uppermost layer of a stack which has already been formed, said moving means then retracting the thus-lowered arms back to said retracted position from the stacking location while the transported layer of lumber forms the next uppermost layer of the stack, said arms when lowered at said stacking location by said tilting means becoming situated sufficiently beneath said horizontal plane to move back to said retracted position situated beneath the next layer which is to be transported, each arm having a smooth upper edge region which engages beneath each layer during transportation thereof from the lifting location to the stacking location, and each arm having at a rear part of said upper edge region thereof a stop for engaging behind that end piece of lumber which trails in the direction of travel of each layer from the lifting location to the stacking location.

4. The combination of claim 3 and wherein each arm when in its upper raised position, supporting a layer above said horizontal plane, has a lower edge region situated sufficiently above the uppermost layer of that part of the stack which has already been formed at the stacking location to prevent contact between said arms and any part of the already formed stack which has a crooked piece of lumber extending somewhat higher than other pieces of lumber of the uppermost layer of that part of the stack which has already been formed.

5. The combination of claim 4 and wherein said conveyor means and moving means operate cyclically in synchronism to provide by way of said conveyor means at said lifting location a layer of lumber ready to be raised by said arms when the latter have returned to said retracted position thereof.

6. The combination of claim 5 and including two pairs of said arms transversely distributed with respect to the direction of travel from said lifting location to said stacking location, and one of said tilting means being operatively connected with each of said pairs of arms for tilting each pair of arms when at said retracted position upwardly to raise a layer above the horizontal plane at said lifting location and maintaining the raised layer in an elevated position while each pair of arms is moved by said moving means to the stacking location where each pair of arms is lowered by the tilting means connected thereto for lowering the transported layer at the stacking location, with said moving means then retracting each pair of arms back to the retracted position thereof beneath a layer of lumber at said lifting location.

7. The combination of claim 6 and wherein said moving means cooperates with said pairs of arms for advancing one pair of arms which carries a layer of lumber from said lifting location to said stacking location while retracting the other pair of arms from said stacking location to said lifting location, and so on, and said conveyor means providing a layer of lumber to be raised by each pair of arms when it has returned to the retracted position thereof.

* * * * *